(12) United States Patent
Sawada et al.

(10) Patent No.: US 9,951,966 B2
(45) Date of Patent: Apr. 24, 2018

(54) AIR CONDITIONER (71) Applicant: Mitsubishi Electric Corporation, Tokyo (JP)

(72) Inventors: Kazushige Sawada, Tokyo (JP); Norikazu Ito, Tokyo (JP); Katsuyuki Amano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 370 days.

(21) Appl. No.: 14/922,427

(22) Filed: Oct. 26, 2015

(65) Prior Publication Data

US 2016/0131387 A1 May 12, 2016

(30) Foreign Application Priority Data

Nov. 7, 2014 (JP) .................................. 2014-227563

(51) Int. Cl.
*F24F 11/00* (2006.01)
*H02H 3/253* (2006.01)
*H02H 9/00* (2006.01)

(52) U.S. Cl.
CPC ........ *F24F 11/0076* (2013.01); *F24F 11/006* (2013.01); *H02H 3/253* (2013.01); *H02H 9/001* (2013.01); *F24F 2011/0075* (2013.01); *Y10T 307/826* (2015.04)

(58) Field of Classification Search
CPC .................................. Y10T 307/826–307/865
See application file for complete search history.

(56) References Cited

U.S. PATENT DOCUMENTS 8,766,481 B2 * 7/2014 Divan .................... H02H 3/025
307/103
2015/0001962 A1 1/2015 Higashiyama et al.

FOREIGN PATENT DOCUMENTS

| EP | 2241831 A1 | 10/2010 |
| EP | 2241831 A8 | 2/2011 |
| JP | 63-046339 A | 2/1988 |
| JP | 07308020 A * | 11/1995 |
| JP | 2010-243051 A | 10/2010 |

(Continued)

OTHER PUBLICATIONS

Extended European Search Report dated Apr. 14, 2016 issued in corresponding EP patent application No. 15191363.9.

*Primary Examiner* — Fritz M Fleming
(74) *Attorney, Agent, or Firm* — Posz Law Group, PLC (57) ABSTRACT

An air conditioner includes an outdoor device and an indoor device. The outdoor device includes an outdoor control unit that is operated at the voltage of a smoothing capacitor; a power-supply switching relay to which a signal line is connected; an inrush-current preventing-relay drive unit that is operated when single-phase AC power is supplied between a power-signal common line and the signal line via an outdoor activation relay in the indoor device and the power-supply switching relay; a first inrush-current preventing relay that is connected in parallel with a power supply relay and is controlled by the inrush-current preventing-relay drive unit; and a second inrush-current preventing relay that is connected in parallel with the first inrush-current preventing relay and is controlled by the outdoor control unit. The outdoor control unit closes the second inrush-current preventing relay when the external power supply is interrupted.

8 Claims, 4 Drawing Sheets (56) References Cited

FOREIGN PATENT DOCUMENTS

| | | |
|---|---|---|
| JP | 2012-110183 A | 6/2012 |
| JP | 2012-175882 A | 9/2012 |
| JP | 2014-156963 A | 8/2014 |
| WO | 2013/099277 A1 | 7/2013 |

* cited by examiner

AIR CONDITIONER

BACKGROUND OF THE INVENTION

1. Field of the Invention

The present invention relates to an air conditioner that can reduce power consumption of an outdoor device in a standby state.

2. Description of the Related Art

Configurations of air conditioners for reducing the power consumption of the outdoor device in a standby state has been previously proposed, for example, in Japanese Patent Application Laid-open No. 2010-243051.

In the air conditioner described in Japanese Patent Application Laid-open No. 2010-243051, an indoor device and an outdoor device are connected to each other with a three-core cable that includes a power line, a common line, and a signal line, and a commercial power source is connected to either one of the outdoor device and the indoor device so that power is supplied via the power line and the common line. The indoor device includes an outdoor activation relay that opens and closes the connection between the power line and the signal line, and an indoor control unit that operates the outdoor activation relay so that the commercial power is supplied between the signal line and the common line. The outdoor device includes a power supply relay that opens and closes a connection between the commercial power source and an outdoor rectifier circuit, and closes the power supply relay when commercial power is supplied between the signal line and the common line.

With an air conditioner that operates with an external power supply, the bus voltage inevitably drops when the power supply is cut during energization. In a configuration in which the power supply relay remains closed when the external power supply is cut during energization, an inrush current generated when the power supply is restarted may cause a failure in the power supply relay and the rectifier circuit. Therefore, it is necessary to select a power supply relay and a rectifier circuit element that can withstand the inrush current in a conventional air conditioner.

Further, it is also possible that the power supply relay is kept open when the external power supply is cut in order to prevent the failure of the power supply relay and the rectifier circuit element. However, with such a control technique, self-recovery cannot be achieved even after the power supply is restarted. To restart the operation of the outdoor device in this case, after the outdoor device is turned off, it is necessary to supply commercial power between the signal line and the common line in the indoor device in order to supply power to the outdoor device anew. Therefore, even when there is an instantaneous power failure that lasts for a short while, there is still a problem in that it is necessary to reactivate the outdoor device, thus making the stop time longer and the operation less user friendly.

SUMMARY OF THE INVENTION

It is an objective of the present invention to at least partially solve the problem in the conventional technology mentioned above.

The present invention relates to an air conditioner that includes an outdoor device and an indoor device that are connected to each other via a three-core cable including a power line, a power-signal common line, and a signal line, three-phase AC power being connected to the outdoor device via a power supply relay, and single-phase AC power being supplied to the indoor device via the power line and the power-signal common line, which are two connection lines connected to the three-phase AC power source. The indoor device includes an outdoor activation relay that opens and closes connection between the power line and the power-signal common line, and an indoor control unit that operates the outdoor activation relay in order to supply single-phase AC power between the signal line and the power-signal common line. The outdoor device includes an outdoor rectifier unit that is connected to the power supply relay, a smoothing capacitor that smooths an output of the outdoor rectifier unit, an outdoor control unit that is operated by a voltage of the smoothing capacitor, a power-supply switching relay to which the signal line is connected, an inrush-current preventing-relay drive unit that is operated when single-phase AC power is supplied between the power-signal common line and the signal line via the outdoor activation relay and the power-supply switching relay, a first inrush-current preventing relay that is connected in parallel with the power supply relay and is controlled by the inrush-current preventing-relay drive unit, a second inrush-current preventing relay that is connected in parallel with the first inrush-current preventing relay and is controlled by the outdoor control unit. The second inrush-current preventing relay is closed when an external power supply is interrupted.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an air conditioner according to the present invention will be explained below in detail with reference to the accompanying drawings. The present invention is not limited to the embodiments.

First Embodiment

Figure 1:
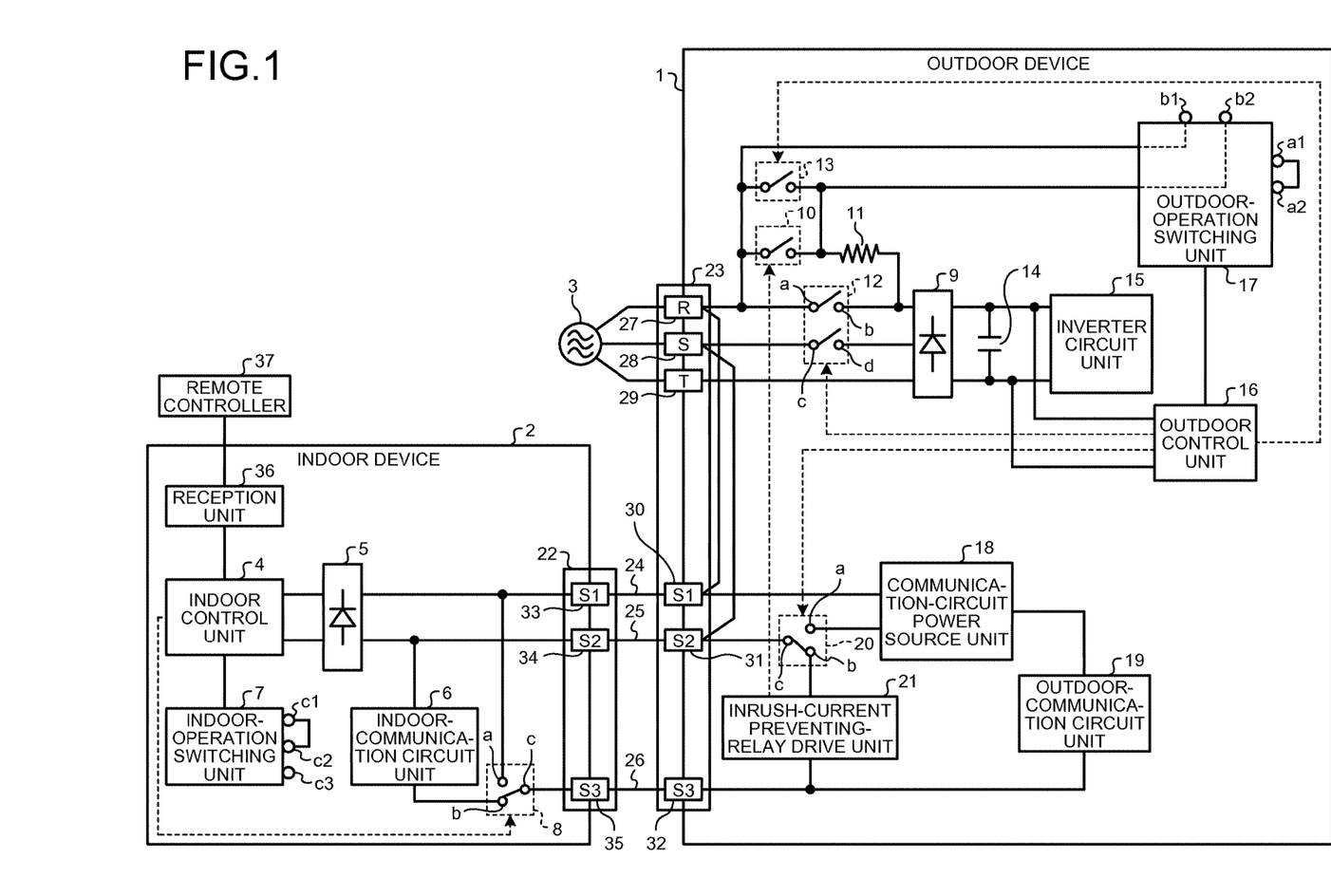
FIG. 1 is a block diagram illustrating an electric system of an air conditioner according to a first embodiment of the present invention.

FIG. 1 is a block diagram illustrating an electric system of an air conditioner according to a first embodiment of the present invention. As illustrated in FIG. 1, the air conditioner according to the first embodiment includes an outdoor device 1 and an indoor device 2. The connection state before activation of the outdoor device 1 is specifically illustrated in FIG. 1. Note that in the following descriptions, "physical connection" and "electrical connection" are not distinguished from each other and are simply referred to as "connection".

<General Configuration of Air Conditioner>

First, a general configuration of the air conditioner is described with reference to FIG. 1. The air conditioner includes the outdoor device 1 and the indoor device 2. The outdoor device 1 and the indoor device 2 are connected to each other via a three-core cable that includes a power line 24, a power-signal common line 25, and a signal line 26. A three-phase AC power source 3 is connected to the outdoor device 1, and from two lines thereof, single-phase AC power is supplied to the indoor device 2 via the power line 24 and the power-signal common line 25. The indoor device 2 includes an outdoor activation relay 8 that opens and closes connections between the power line 24 and the power-signal common line 25, and an indoor control unit 4 that operates the outdoor activation relay 8 so that the single-phase AC power is supplied between the signal line 26 and the power-signal common line 25. The outdoor device 1 includes a power supply relay 12 that opens and closes connections between the three-phase AC power source 3 and the outdoor device 1, the connections being connected to the three-phase AC power source 3; an outdoor rectifier unit 9 connected to the power supply relay 12; a smoothing capacitor 14 that smooths the output of the outdoor rectifier unit 9; an outdoor-communication circuit unit 19 that communicates with the indoor device 2 via the power-signal common line 25 and the signal line 26; a power-supply switching relay 20 to which the signal line 26 is connected; an inrush-current preventing-relay drive unit 21 that is operated when single-phase AC power is supplied between the signal line 26 and the power-signal common line 25 via the outdoor activation relay 8 and when single-phase AC power is supplied via the outdoor activation relay 8 and the power-supply switching relay 20; a first inrush-current preventing relay 10 that is connected in parallel with the power supply relay 12 and is controlled by the inrush-current preventing-relay drive unit 21; and a second inrush-current preventing relay 13 that is connected in parallel with the first inrush-current preventing relay 10 and is controlled by an outdoor control unit 16.

<Detailed Configuration of Air Conditioner>

Next, a more detailed configuration of the air conditioner is given. The outdoor device 1 includes an outdoor terminal base 23 having an R-terminal 27, an S-terminal 28, a T-terminal 29, an outdoor S1 terminal 30, an outdoor S2 terminal 31, and an outdoor S3 terminal 32. The R-terminal 27, the S-terminal 28, and the T-terminal 29 are connected to the three-phase AC power source 3 so that electric power from the three-phase AC power source 3 is supplied to the outdoor device 1. Within the outdoor device 1, the outdoor S1 terminal 30 and the R-terminal 27 are connected to each other and the outdoor S2 terminal 31 and the S-terminal 28 are connected to each other so that single-phase AC power is supplied. Note that the electric power supplied to the outdoor S1 terminal 30 and the outdoor S2 terminal 31 is not limited to the single-phase electric power between the R-terminal 27 and the S-terminal 28, but single-phase electric power from any two phases in the three-phase AC power source 3 can be used.

The indoor device 2 includes an indoor terminal base 22 that has an indoor S1 terminal 33, an indoor S2 terminal 34, and an indoor S3 terminal 35. The indoor S1 terminal 33 is connected to the outdoor S1 terminal 30 via the power line 24; the indoor S2 terminal 34 is connected to the outdoor S2 terminal 31 via the power-signal common line 25; and the indoor S3 terminal 35 is connected to the outdoor S3 terminal 32 via the signal line 26.

The indoor device 2 includes the indoor control unit 4, an indoor rectifier unit 5, an indoor-communication circuit unit 6, an indoor-operation switching unit 7, the outdoor activation relay 8, and a reception unit 36. The outdoor activation relay 8 has an a-terminal, a b-terminal, and a c-terminal. The a-terminal is connected to the indoor S1 terminal 33, the b-terminal is connected to the indoor-communication circuit unit 6, and the c-terminal is connected to the indoor S3 terminal 35. The c-terminal, which is one contact of the outdoor activation relay 8, is always connected to the indoor S3 terminal 35; and the other contact is connected to either one of the a-terminal and the b-terminal. The outdoor activation relay 8 is able to switch so that the indoor S3 terminal 35 and the indoor S1 terminal 33 are connected or the indoor S3 terminal 35 and the indoor-communication circuit unit 6 are connected.

The indoor control unit 4 operates the outdoor activation relay 8. When the indoor control unit 4 does not operate the outdoor activation relay 8, i.e., when the outdoor device 1 is not energized, the indoor S3 terminal 35 and the indoor-communication circuit unit 6 are connected to each other via the outdoor activation relay 8; the power-signal common line 25 and the signal line 26 are connected to the outdoor device 1; and a communication line between the outdoor device 1 and the indoor device 2 is established and various types of driving signals are transmitted and received.

In contrast, when the outdoor activation relay 8 is operated, i.e., the outdoor device 1 is energized, the indoor S3 terminal 35 and the indoor S1 terminal 33 are connected to each other; and single-phase AC power is supplied between the power-signal common line 25 and the signal line 26.

The indoor S1 terminal 33 is connected to the indoor rectifier unit 5, and the indoor S2 terminal 34 is connected to the indoor rectifier unit 5 and the indoor-communication circuit unit 6. The single-phase AC voltage applied between the power line 24 and the power-signal common line 25 is converted into a DC voltage in the indoor rectifier unit 5, and electric power is supplied to the indoor control unit 4.

The indoor-operation switching unit 7 connected to the indoor control unit 4 determines whether to reduce the standby electric power while on standby. In the example of FIG. 1, whether to reduce the standby electric power is set up by using a jumper cable. The standby electric power while on standby is reduced in a case where a jumper cable is connected between a c1-terminal and a c2-terminal of the indoor-operation switching unit 7, whereas the standby electric power while on standby is not reduced in a case where the jumper cable is connected between the c2-terminal and a c3-terminal. The switching method of whether to reduce the standby electric power is not limited to the method using the jumper cable but may be achieved by using a switch.

The reception unit 36 is connected to a remote controller 37 and the indoor control unit 4. The reception unit 36 receives a driving command from the remote controller 37 and transmits the received command to the indoor control unit 4.

The outdoor device 1 includes the outdoor rectifier unit 9, the first inrush-current preventing relay 10, an inrush-current preventing resistor 11, the power supply relay 12, the second inrush-current preventing relay 13, the smoothing capacitor 14, an inverter circuit unit 15, the outdoor control unit 16, and an outdoor-operation switching unit 17. The power supply relay 12 is a two-contact relay in FIG. 1, but it may be configured from two one-contact relays.

One end of the first inrush-current preventing relay 10, one end of the second inrush-current preventing relay 13, and a terminal at one end (the a-terminal) of the power supply relay 12 are connected to the R-terminal 27. The other ends of the first inrush-current preventing relay 10 and the second inrush-current preventing relay 13 are connected to one end of the inrush-current preventing resistor 11. The other end of the inrush-current preventing resistor 11 is connected to a terminal at the other end (the b-terminal) of the power supply relay 12 and the outdoor rectifier unit 9. Further, both ends of the first inrush-current preventing relay 10 and those of the second inrush-current preventing relay 13 are connected to the outdoor-operation switching unit 17.

A terminal at the one end (the c-terminal) of the power supply relay 12 is connected to the S-terminal 28, and a terminal at the other end (a d-terminal) of the power supply relay 12 is connected to the outdoor rectifier unit 9. The T-terminal 29 is connected to the outdoor rectifier unit 9.

Although the terminals at the one end (the a-terminal and the b-terminal) of the power supply relay 12 are respectively connected to the R-terminal 27 and the S-terminal 28 in FIG. 1, they may be connected to any two of the R-terminal 27, the S-terminal 28, and the T-terminal 29. Also, one end and the other end of a circuit portion in which the inrush-current preventing resistor 11 is connected in series to a parallel circuit of the first inrush-current preventing relay 10 and the second inrush-current preventing relay 13 are respectively connected to the a-terminal and the b-terminal in FIG. 1. However, they may be connected to the c-terminal and the d-terminal, respectively. That is, it is sufficient that the one end and the other end of the circuit portion are connected to an input and an output of any one contact in the power supply relay 12.

The outdoor rectifier unit 9 rectifies an AC voltage of the three-phase AC power source 3 and converts it into an arbitrary DC voltage. The power supply relay 12 and the second inrush-current preventing relay 13 are operated by the outdoor control unit 16, which open the contacts thereof when they not being operated, as illustrated in FIG. 1.

The outdoor-operation switching unit 17 is connected to both ends of the first inrush-current preventing relay 10 and is also connected to the outdoor control unit 16. The outdoor-operation switching unit 17 determines whether to reduce the standby electric power while on standby. In the example of FIG. 1, whether to reduce the standby electric power is set up by using a jumper cable. The standby electric power while on standby is reduced in a case where the jumper cable is connected between an a1-terminal and an a2-terminal of the outdoor-operation switching unit 17. In contrast, in a case where the jumper cable is connected between a b1-terminal and a b2-terminal, a current path is formed by the b1-terminal and the b2-terminal that bypasses the first inrush-current preventing relay 10, and therefore the standby electric power while on standby is not reduced. Information as to whether to reduce the standby electric power while on standby is transmitted from the outdoor-operation switching unit 17 to the outdoor control unit 16.

Both ends of the smoothing capacitor 14 are connected to the outdoor rectifier unit 9. The smoothing capacitor 14 smooths the output from the outdoor rectifier unit 9 and applies a DC voltage to the inverter circuit unit 15 and the outdoor control unit 16 that are connected thereto.

The outdoor device 1 further includes the power-supply switching relay 20, a communication-circuit power source unit 18, the inrush-current preventing-relay drive unit 21 and the outdoor-communication circuit unit 19. The power-supply switching relay 20 has an a-terminal, a b-terminal, and a c-terminal. The a-terminal is connected to the communication-circuit power source unit 18, the b-terminal is connected to the inrush-current preventing-relay drive unit 21, and the c-terminal is connected to the outdoor S2 terminal 31. The c-terminal is one contact of the power-supply switching relay 20 and is always connected to the outdoor S2 terminal 31, while the other contact thereof is connected to either one of the a-terminal and the b-terminal. With the power-supply switching relay 20, it is possible to switch between connecting the outdoor S2 terminal 31 to the inrush-current preventing-relay drive unit 21 and connecting the outdoor S2 terminal 31 to the communication-circuit power source unit 18.

The operations of the power-supply switching relay 20 is controlled by the outdoor control unit 16. When the power-supply switching relay 20 is not operated, the b-terminal and the c-terminal in the contacts are connected to each other; thereby, the outdoor S2 terminal 31 is connected to the inrush-current preventing-relay drive unit 21 via the power-supply switching relay 20. With this connection, when single-phase AC power is supplied between the power-signal common line 25 and the signal line 26 by the indoor device 2, the inrush-current preventing-relay drive unit 21 is energized, and the first inrush-current preventing relay 10 closes its contact.

When the power-supply switching relay 20 is operated, the a-terminal and the c-terminal in the contacts are connected to each other; thereby, the outdoor S2 terminal 31 is connected to the communication-circuit power source unit 18 via the power-supply switching relay 20. Thus, the communication-circuit power source unit 18, to which the single-phase AC voltage between the power line 24 and the power-signal common line 25 is applied, generates a DC voltage and supplies power to the outdoor-communication circuit unit 19. The generation of the DC voltage can be achieved by a half-wave rectifier circuit, but is not limited thereto.

The inverter circuit unit 15 is controlled by the outdoor control unit 16 in order to convert the DC voltage supplied thereto into an AC voltage having arbitrary frequency and arbitrary voltage. A load (not illustrated) is connected to the inverter circuit unit 15. In a case of an air conditioner, a motor is connected to the inverter circuit unit 15 and it drives a compressor.

<Operations while on Standby>

Next, operations of the air conditioner while on standby are described with reference to FIG. 1. First, electric power from the three-phase AC power source 3 is input to the outdoor device 1 via the R-terminal 27, the S-terminal 28, and the T-terminal 29. Here, the contacts are opened in the first inrush-current preventing relay 10, the second inrush-current preventing relay 13, and the power supply relay 12 while on standby. Therefore, electric power is not supplied to the inverter circuit unit 15, the outdoor-operation switching unit 17, and the outdoor control unit 16 that are the loads in the outdoor device.

Although the communication-circuit power source unit 18 is connected to the power line 24 at its one end via the outdoor S1 terminal 30, its other end is disconnected from the outdoor S2 terminal 31 by the power-supply switching relay 20, and therefore electric power is not supplied thereto. Accordingly, electric power is also not supplied to the outdoor-communication circuit unit 19 for the same reason. In addition, although the inrush-current preventing-relay drive unit 21 is connected to the power-signal common line 25 at its one end via the outdoor S2 terminal 31, its other end is connected to the signal line 26 via the outdoor S3 terminal 32, and therefore the electric power is not supplied to the inrush-current preventing-relay drive unit 21.

With the operation described above, standby electric power in the outdoor device 1 is reduced while on standby.

<Operations Until Start of Driving Operation>

Next, operations until the air conditioner starts a driving operation are described. When electric power from the three-phase AC power source 3 is input via the power line 24 and the power-signal common line 25, the power is supplied to the indoor control unit 4 in the indoor device 2, and the indoor device 2 is activated. After the activation, the setting-up of the indoor-operation switching unit 7 is checked. In the example of FIG. 1, because the jumper cable is connected between the c1-terminal and the c2-terminal, the air conditioner is recognized as an air conditioner with the electric power reduced while on standby. The indoor control unit 4 shifts to a state of waiting for a driving command from the remote controller 37 via the reception unit 36.

Upon reception of a driving command signal from the remote controller 37, the indoor control unit 4 turns on the outdoor activation relay 8, disconnects the indoor S3 terminal 35 from the indoor-communication circuit unit 6, and switches the connection so that it is between the indoor S3 terminal 35 and the indoor S1 terminal 33. With this control operation, a single-phase AC voltage is applied between the outdoor S2 terminal 31 and the outdoor S3 terminal 32.

When electric power is supplied between the outdoor S2 terminal 31 and the outdoor S3 terminal 32, the inrush-current preventing-relay drive unit 21 is energized via the power-supply switching relay 20, and the first inrush-current preventing relay 10 is turned on so that its contact is closed. When the first inrush-current preventing relay 10 is closed, the AC voltage from the three-phase AC power source 3 is converted into a DC voltage by the outdoor rectifier unit 9; and the converted DC voltage is applied to the smoothing capacitor 14 and the inverter circuit unit 15.

Because a power-supply path passing through the first inrush-current preventing relay 10 includes the inrush-current preventing resistor 11 therein, a short circuit can be prevented. The application of the DC voltage activates the outdoor control unit 16. The outdoor control unit 16 turns on the second inrush-current preventing relay 13, thereby closing the contact thereof. The outdoor control unit 16 monitors the voltage charge in the smoothing capacitor 14, and after confirming that the voltage has become stable at a set voltage, it turns on the power supply relay 12 in order to close the contacts of the power supply relay 12. The outdoor control unit 16 then turns off the second inrush-current preventing relay 13, thereby opening the contact in the second inrush-current preventing relay 13.

After an arbitrary set time has elapsed after the outdoor activation relay 8 is turned on, the indoor control unit 4 turns off the outdoor activation relay 8, thereby disconnecting the indoor S3 terminal 35 from the indoor S1 terminal 33, and switches the connection so that it is between the indoor S3 terminal 35 and the indoor-communication circuit unit 6. With this control operation, the single-phase AC voltage applied between the outdoor S2 terminal 31 and the outdoor S3 terminal 32 is cut, and the inrush-current preventing-relay drive unit 21 enters a non-energized state. Thus, the first inrush-current preventing relay 10 is turned off and opens its contacts. With this operation, a short circuit during an activation operation of the outdoor-device can be prevented.

When the inrush-current preventing-relay drive unit 21 enters a non-energized state, the outdoor control unit 16 turns on the power-supply switching relay 20 so that the connection between the outdoor S2 terminal 31 and the inrush-current preventing-relay drive unit 21 is opened and switches the connection so that it is between the outdoor S2 terminal 31 and the communication-circuit power source unit 18. With this control operation, the single-phase AC voltage between the outdoor S1 terminal 29 and the outdoor S2 terminal 30 is applied to the communication-circuit power source unit 18. The communication-circuit power source unit 18 converts the single-phase AC voltage into an arbitrary DC voltage and applies the converted DC voltage to the outdoor-communication circuit unit 19.

Note that the outdoor activation relay 8 is turned off by the indoor control unit 4 and thereafter the first inrush-current preventing relay 10 is turned off in the procedure in the above descriptions; however, the order of this operation may be inverted such that the power-supply switching relay 20 is turned on first. In a case where the power-supply switching relay 20 is turned on first, the inrush-current preventing-relay drive unit 21 enters a non-energized state and the first inrush-current preventing relay 10 is turned off. Therefore, the outdoor device 1 can be activated even in the inverted order.

The outdoor control unit 16 activates the outdoor-communication circuit unit 19, thereby starting communication with the indoor device 2. The outdoor-communication circuit unit 19 starts communication with the indoor-communication circuit unit 6 via the power-signal common line 25 and the signal line 26. The outdoor control unit 16 determines whether communication between the outdoor-communication circuit unit 19 and the indoor-communication circuit unit 6 has been established. When communication has been established, routine communication between the indoor device 2 and the outdoor device 1 is performed. In response to a driving command from the indoor device 2, the outdoor control unit 16 starts a heating operation or a cooling operation. When communication has not been established, then an attempt to establish communication is performed again. The determination is repeated to establish whether there is communication for a predetermined number of times or for a predetermined period of time. In a case where the communication cannot be established, it is determined that an abnormality in the communication has occurred. When the communication has been established, the routine communication starts between the indoor device 2 and the outdoor device 1.

<Operations at Instantaneous Power Failure>

Figure 2:
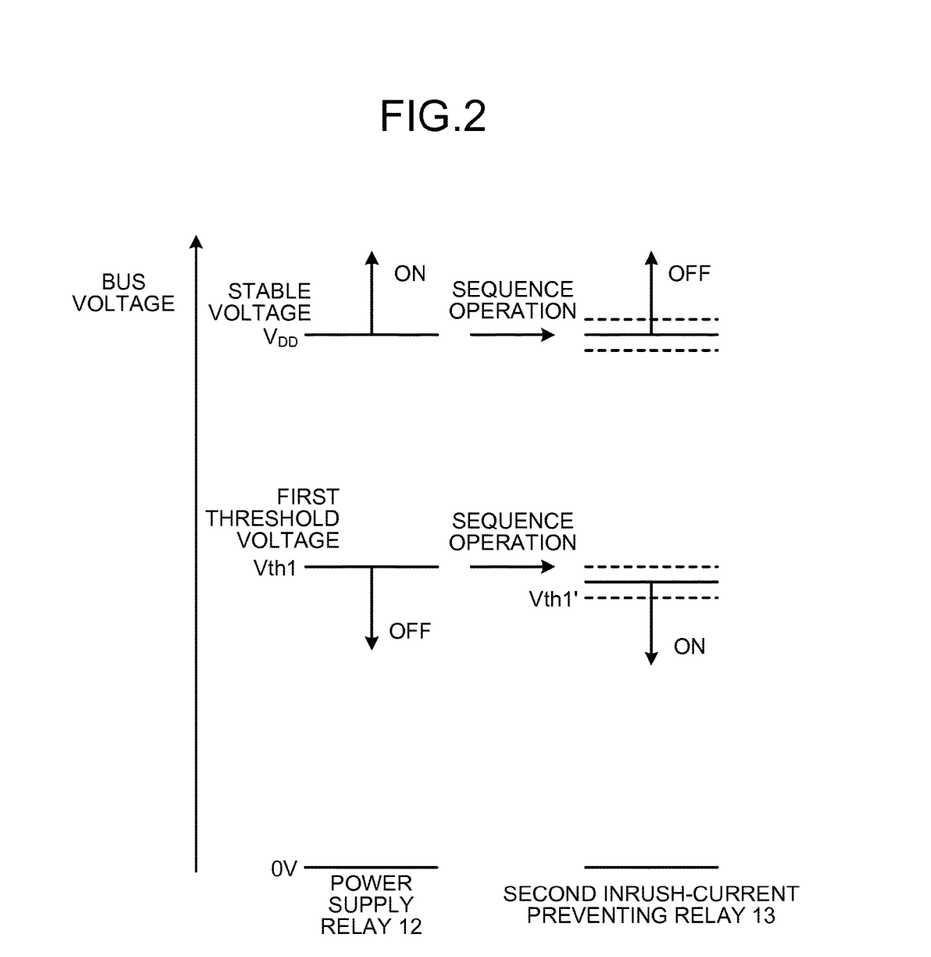
FIG. 2 is an explanatory diagram illustrating the operation of the air conditioner according to the first embodiment at an instantaneous power failure.

Next, operations are described, with reference to FIGS. 1 and 2, when the external power supply from the three-phase AC power source 3 is interrupted during energization of the outdoor device for a short time because of an instantaneous power failure or the like (hereinafter collectively referred to as "instantaneous power failure"). FIG. 2 is an explanatory diagram illustrating the operation of the air conditioner according to the first embodiment at an instantaneous power failure. In its left portion, FIG. 2 illustrates a sequence operation of the power supply relay 12, and in its right portion, FIG. 2 illustrates a sequence operation of the second inrush-current preventing relay 13, in relation to a bus voltage. The "bus voltage" herein is the voltage of a connection line (also referred to as "DC bus") connecting the outdoor rectifier unit 9 and the inverter circuit unit 15 to each other, which matches the voltage of the smoothing capacitor 14 in the example of FIG. 1. Descriptions are made below with the "voltage of the smoothing capacitor 14" referred to as the "bus voltage".

The bus voltage is monitored by the outdoor control unit 16, as described above. When the power supply is interrupted, the bus voltage drops because a certain amount of load is connected to the circuit. As the load becomes larger, the speed of the bus voltage drop becomes faster. Because the contacts of the power supply relay 12 are closed during energization of the outdoor device, the bus voltage is instantaneously raised and recovered to a voltage that is obtained by smoothing the power-source voltage and is restored when the power supply is immediately recovered. Conversely, when the power supply is not recovered, the bus voltage continues to drop.

Thus, in the first embodiment, when the bus voltage drops below a first threshold voltage (Vth1), the power supply relay 12 is turned off so that the contacts of the power supply relay 12 are opened; and then the second inrush-current preventing relay 13 is turned on so that the contact of the second inrush-current preventing relay 13 is closed, as illustrated in FIG. 2. Because the above operation is a sequence operation, the bus voltage when the contact of the second inrush-current preventing relay 13 is closed may be a voltage (Vth1': Vth1'<Vth1) lower than the first threshold voltage Vth1.

Even when the bus voltage drops below the first threshold voltage (Vth1) and further continues to drop, the outdoor control unit 16 keeps the second inrush-current preventing relay 13 ON-operated, as long as the bus voltage is at a level at which the outdoor control unit 16 can operate. When the power is recovered to a voltage at which the outdoor control unit 16 can operate, the voltage of the smoothing capacitor 14 can be recovered along a path passing through the second inrush-current preventing relay 13 and the inrush-current preventing resistor 11. Further, because the path passes through the inrush-current preventing resistor 11, it is possible to limit the inrush current value so as to be able to prevent a failure of a circuit in a later stage of, for example, the outdoor rectifier unit 9 caused by an excessively large inrush current.

When the bus voltage is recovered to the voltage obtained by smoothing the power-source voltage (hereinafter, the voltage is referred to as "stable voltage", and denoted as "$V_{DD}$"), the outdoor control unit 16 confirms that the bus voltage has become stable (this voltage is called the stable voltage ($V_{DD}$)); then turns on the power supply relay 12 in order to close the contacts of the power supply relay 12; and subsequently turns off the second inrush-current preventing relay 13 so that the contact of the second inrush-current preventing relay 13 is opened. As long as the power supply from the three-phase AC power source 3 continues, a charging current to the smoothing capacitor 14 is supplied via the power supply relay 12, but it does not flow through the second inrush-current preventing relay 13. With the control operation described above, it is possible to reduce unnecessary power in the air conditioner.

In a case where the power supply from the three-phase AC power source 3 is interrupted and the bus voltage drops to a level at which the outdoor control unit 16 cannot operate, the outdoor control unit 16 cannot turn on the second inrush-current preventing relay 13, and therefore the contact of the second inrush-current preventing relay 13 is opened. Thus, even when the power supply is recovered, the outdoor device cannot be activated by itself. In this case, as a general procedure, a single-phase AC voltage is applied between the outdoor S2 terminal 31 and the outdoor S3 terminal 32 by the indoor device 2, thereby activating the outdoor device 1.

As described above, according to the air conditioner according to the first embodiment, the second inrush-current preventing relay 13 is provided, which is connected in parallel to the first inrush-current preventing relay 10 and is controlled by the outdoor control unit 16, so that the second inrush-current preventing relay 13 is closed when the external power supply is interrupted. Therefore, it is possible to enhance the possibility of self-recovery, to reduce the time for restarting the operation, and to improve user friendliness.

Further, according to the air conditioner of the first embodiment, the outdoor device 1 is provided with the second inrush-current preventing relay 13, which can control itself and therefore can prepare for power recovery by itself, even when the external power supply is interrupted because of an instantaneous power failure. Thus, it is not necessary to make the indoor device 2 activate the recovery of the outdoor device 1 at the recovery of power; and the time for the recovery is shortened. The time for the recovery is short so that user friendliness is not adversely affected.

In addition, the air conditioner according to the first embodiment can also advantageously limit the inrush current value so that it is unnecessary to select elements for the downstream circuits with high resistance to failure due to an excessively large inrush current.

Here, the control operation of the second inrush-current preventing relay 13 can be replaced with a first modification described below.

<Modification of Control Operation—First Modification>

In the first embodiment described above, when the bus voltage drops below the first threshold voltage (Vth1), in addition to the contacts of the power supply relay 12 being opened, the contact of the second inrush-current preventing relay 13 is closed. When the bus voltage is recovered to the stable voltage, in addition to the contacts of the power supply relay 12 being closed, the contact of the second inrush-current preventing relay 13 is opened. However, as long as the outdoor control unit 16 is operable, the contact of the second inrush-current preventing relay 13 may be continuously controlled such that it is closed. With this control operation, the control operation for turning off the second inrush-current preventing relay 13 is not required, and therefore there is an advantage in that the control operation can be simplified.

Furthermore, a case where three-phase power is supplied by the three-phase AC power source 3 is described as an example in the first embodiment. However, single-phase power may be supplied by a single-phase power source. In this case, a configuration, in which the power supply relay 12 cuts electric connection for one of two phases, may be adopted, and the same effects can be also obtained even when the single-phase power source is used.

Second Embodiment

The air conditioner according to the first embodiment is configured to reduce the standby electric power of the outdoor device 1 while on standby. More specifically, the air conditioner according to the first embodiment includes the second inrush-current preventing relay 13 for causing the outdoor device 1 to perform self-recovery when the external power supply is interrupted because of an instantaneous power failure and the voltage of the smoothing capacitor 14, which is the bus voltage, drops. Conversely, in an air conditioner according to a second embodiment of the present invention, the operations of the second inrush-current preventing relay 13 and the power supply relay 12, which have the same configurations as those in the first embodiment, are changed.

Figure 3:
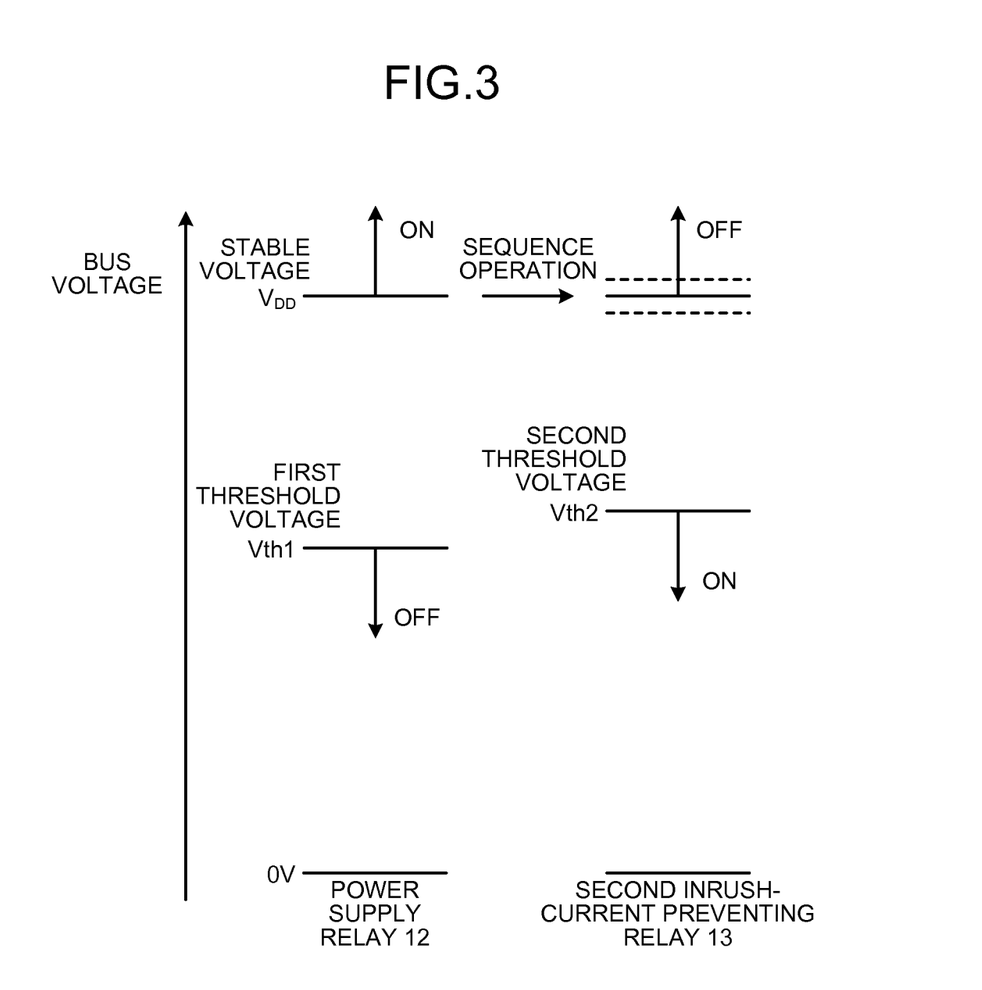
FIG. 3 is an explanatory diagram illustrating the operation of an air conditioner according to a second embodiment of the present invention during an instantaneous power failure.

Next, operations of the air conditioner according to the second embodiment are described with reference to FIGS. 1 and 3. FIG. 3 is an explanatory diagram illustrating the operation of the air conditioner according to the second embodiment at an instantaneous power failure, and an operation when the power supply from the three-phase AC power source 3 is interrupted for a short time because of an instantaneous power failure during energization of the outdoor device is illustrated.

In FIG. 3, when the bus voltage drops because of an instantaneous power failure, the bus voltage continues to drop unless the power is recovered. In the second embodiment, a second threshold voltage (Vth2) which is a higher voltage value than the first threshold voltage (Vth1) is set, as illustrated in FIG. 3. Therefore, when the bus voltage drops, a determining process comparing bus voltage with the second threshold voltage (Vth2) is performed first, and the outdoor control unit 16 turns on the second inrush-current preventing relay 13 to close the contact of the second inrush-current preventing relay 13.

When the voltage continues to drop thereafter, the bus voltage further drops and a determining process comparing the bus voltage with the first threshold voltage (Vth1) is performed. When the bus voltage becomes lower than the first threshold voltage (Vth1), the outdoor control unit 16 turns off the power supply relay 12 to open the contacts of the power supply relay 12. In this case, the first threshold voltage (Vth1) is set to a value at or below which a circuit in a later stage may be damaged when an inrush current flows. In other words, it is much less likely that the circuit in the later stage is damaged if the contacts of the power supply relay 12 are opened at or below the first threshold voltage (Vth1).

In a case where the bus voltage, when the power is recovered, is higher than the operation voltage (Vth1') illustrated in FIG. 2 and is lower than the first threshold voltage (Vth1), the recovery, when the power is recovered, can be achieved more quickly because the contact in the second inrush-current preventing relay 13 is closed (in the case of FIG. 2, the contact in the second inrush-current preventing relay 13 is not closed in this voltage range). The operations of the power supply relay 12 and the second inrush-current preventing relay 13 after the bus voltage is recovered to the stable voltage ($V_{DD}$) after the power recovery are the same as those in the first embodiment.

In a case where the bus voltage when the power is recovered is higher than the first threshold voltage (Vth1) and is lower than the second threshold voltage (Vth2), because a path is present that passes through the power supply relay 12 that remains closed, the current generated when the power is recovered and flowing through the power supply relay 12 charges the smoothing capacitor 14. In a case where the power is recovered while the bus voltage is lower than the operation voltage (Vth1') illustrated in FIG. 2, operations identical to those in the first embodiment are performed.

As described above, according to the air conditioner of the second embodiment, the second threshold voltage, as a determining threshold for closing the second inrush-current preventing relay 13 for preparing for the power recovery when the bus voltage drops, is set higher than the first threshold voltage as a determining threshold for opening the power supply relay 12. Therefore, quick recovery can be achieved when the power is recovered.

Although a case where three-phase power is supplied by the three-phase AC power source 3 is described as an example in the second embodiment, single-phase power may be supplied by a single-phase power source. In this case, a configuration in which the power supply relay 12 cuts the electric connection for one of two phases may be applied, and the same effects can be also obtained even when the single-phase power source is used.

Third Embodiment

The air conditioners according to the first and second embodiments execute control while monitoring the bus voltage and, when the bus voltage becomes lower than the threshold voltage, operate the power supply relay 12 and the second inrush-current preventing relay 13. Meanwhile, in an air conditioner according to the third embodiment of the present invention, the power-supply frequency is monitored and, when the power-supply frequency is unable to be detected, it is determined that the power supply is interrupted and a relay operation identical to that of the first or second embodiment is performed.

Figure 4:
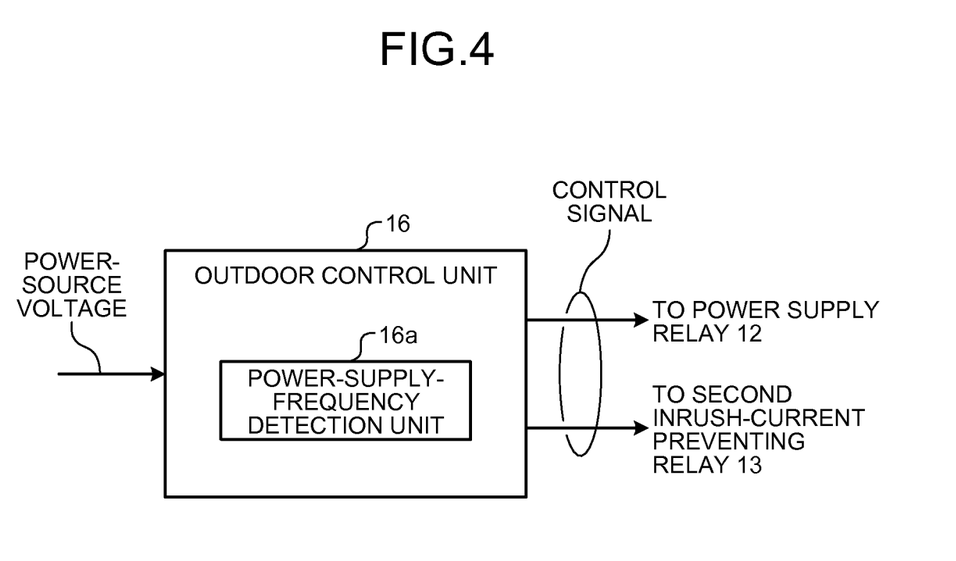
FIG. 4 is a diagram illustrating an example of a configuration of an outdoor control unit in an outdoor device of an air conditioner according to a third embodiment of the present invention.

FIG. 4 is a diagram illustrating an example of a configuration of an outdoor control unit in an outdoor device of the air conditioner according to the third embodiment. The outdoor control unit 16 according to the third embodiment includes a power-supply-frequency detection unit 16a for detecting the power-supply frequency, as illustrated in FIG. 4. The power-source voltage is input to the power-supply-frequency detection unit 16a. The power-supply-frequency detection unit 16a detects the power-supply frequency from the waveform of the power-source voltage. When power is supplied, a frequency of 50 Hertz or 60 Hertz can be detected. When no power is supplied, the power-supply frequency cannot be detected and the detection result is 0 Hertz. The power-supply-frequency detection unit 16a outputs a control signal corresponding to the detection result of the power-supply frequency to the power supply relay 12 and the second inrush-current preventing relay 13.

When the power-supply frequency cannot be detected, the power-supply-frequency detection unit 16a turns off the power supply relay 12 so that the contacts of the power supply relay 12 open and then turns on the second inrush-current preventing relay 13 so that the contact of the second inrush-current preventing relay 13 is closed.

In a case where the circuit load is large, as is the case when the inverter circuit unit 15 is in operation, the voltage of the smoothing capacitor 14 drops quickly, and relay control according to the threshold voltage is executed more quickly than a case where the power-supply frequency is not detected. Conversely, in a case where the circuit load is small, as is the case when the inverter circuit unit 15 is not in operation, the voltage of the smoothing capacitor 14 drops slowly. Therefore, the detection of the presence of the power-supply frequency may enable control operations to be performed more quickly when compared with relay control that makes a comparison with the threshold voltage.

In such a case, it is possible to open the power supply relay 12 at a higher voltage than the first threshold voltage (Vth1) and close the second inrush-current preventing relay 13 at a higher voltage than the operation voltage (Vth1') and the second threshold voltage (Vth2). The first threshold voltage (Vth1) is set at such a voltage level that an inrush current flowing through the power supply relay 12 is not allowed to pass when the contacts are closed at or below the first threshold voltage. Because the relay control can be executed at a higher voltage than the first threshold voltage (Vth1) as a preparation for the power recovery, an unnecessary inrush current does not flow through the power supply relay 12, and protection of a circuit at a later stage, for example, the outdoor rectifier unit 9, can be enhanced. Note that single-phase power can be supplied by a single-phase power source, which is similar to the first and second embodiments.

As described above, according to the air conditioner of the third embodiment, when the power-supply frequency cannot be detected, the power supply relay 12 is opened and the second inrush-current preventing relay 13 is closed. Therefore, an unnecessary inrush current does not flow through the power supply relay 12; and protection of a circuit at a later stage, for example, the outdoor rectifier unit 9, can be enhanced.

Here, the control operation of the second inrush-current preventing relay 13 may be changed as in a second modification described below.

<Modification of Control—Second Modification>

In the third embodiment described above, when the power-supply frequency cannot be detected, the power supply relay 12 is opened and the second inrush-current preventing relay 13 is closed. However, as long as the outdoor control unit 16 is operable, the second inrush-current preventing relay 13 may be continuously controlled so that the contact therein is closed. With this control operation, the control operation for turning off the second inrush-current preventing relay 13 is not required, and the control operation can be simplified.

Further, throughout the first to third embodiments, the control operation of the second inrush-current preventing relay 13 can be changed to a third modification described below.

<Modification of Control—Third Modification>

In the first to third embodiments and first and second modifications described above, the contact of the second inrush-current preventing relay 13 is closed after activation of the outdoor device 1, and it is opened when the charged voltage of the smoothing capacitor 14 becomes stable. However, the contact of the second inrush-current preventing relay 13 may be continuously controlled such that it is closed irrespective of whether the charged voltage of the smoothing capacitor 14 becomes stable. By using this control operation, after activation of the outdoor device 1, the control operation for turning off the second inrush-current preventing relay 13 is not required, and the control operation can be simplified.

According to the present invention, it is possible to enhance the possibility of self-recovery, to reduce the time for restarting an operation, and to improve the user friendliness of an air conditioner.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An air conditioner comprising an outdoor device and an indoor device that are connected to each other via a three-core cable including a power line, a power-signal common line, and a signal line,
   three-phase AC power being connected to the outdoor device via a power supply relay, and
   single-phase AC power being supplied to the indoor device via the power line and the power-signal common line, which are two connection lines connected to the three-phase AC power source, wherein
   the indoor device includes
   an outdoor activation relay that opens and closes connection between the power line and the power-signal common line, and
   an indoor control unit that operates the outdoor activation relay in order to supply single-phase AC power between the signal line and the power-signal common line, the outdoor device includes
an outdoor rectifier unit that is connected to the power supply relay,
a smoothing capacitor that smooths an output of the outdoor rectifier unit,
an outdoor control unit that is operated by a voltage of the smoothing capacitor,
a power-supply switching relay to which the signal line is connected,
an inrush-current preventing-relay drive unit that is operated when single-phase AC power is supplied between the power-signal common line and the signal line via the outdoor activation relay and the power-supply switching relay,
a first inrush-current preventing relay that is connected in parallel with the power supply relay and is controlled by the inrush-current preventing-relay drive unit,
a second inrush-current preventing relay that is connected in parallel with the first inrush-current preventing relay and is controlled by the outdoor control unit, and wherein
the second inrush-current preventing relay is closed when an external power supply is interrupted.

2. The air conditioner according to claim 1, wherein
a first threshold voltage is set in the outdoor device, and
the outdoor control unit, when the external power supply is interrupted and the voltage of the smoothing capacitor becomes lower than the first threshold voltage, opens the power supply relay and thereafter closes the second inrush-current preventing relay.

3. The air conditioner according to claim 1, wherein
a first threshold voltage and a second threshold voltage that has a value larger than that of the first threshold voltage are set in the outdoor device, and
the outdoor control unit, when the external power supply is interrupted and the voltage of the smoothing capacitor becomes lower than the second threshold voltage, closes the second inrush-current preventing relay and, when the voltage of the smoothing capacitor further drops to be lower than the first threshold voltage, opens the power supply relay.

4. The air conditioner according to claim 1, wherein
when the external power supply is recovered and after the voltage of the smoothing capacitor is recovered and becomes stable, the power supply relay is closed and the second inrush-current preventing relay is opened.

5. The air conditioner according to claim 1, wherein
a first threshold voltage is set in the outdoor device, and
the outdoor control unit, when the external power supply is interrupted and the voltage of the smoothing capacitor becomes lower than the first threshold voltage, keeps the second inrush-current preventing relay closed and opens the power supply relay.

6. The air conditioner according to claim 1, wherein
when the external power supply is interrupted and a power-supply frequency of the three-phase AC power source becomes undetectable, the outdoor control unit opens the power supply relay and closes the second inrush-current preventing relay.

7. The air conditioner according to claim 1, wherein
when the external power supply is interrupted and a power-supply frequency of the three-phase AC power source is undetectable, the outdoor control unit keeps the second inrush-current preventing relay closed and opens the power supply relay.

8. The air conditioner according to claim 1, wherein the outdoor control unit keeps the second inrush-current preventing relay closed irrespective of whether the voltage of the smoothing capacitor is stable.

* * * * *